United States Patent [19]
Becker et al.

[11] Patent Number: 5,735,140
[45] Date of Patent: Apr. 7, 1998

[54] METHOD AND APPARATUS FOR PRODUCING HIGH DENSITY DRY ICE

[75] Inventors: James R. Becker, North Ridgeville; Russell Furmanek, Bedford, both of Ohio

[73] Assignee: Waste Minimization and Containment, Inc., Cleveland, Ohio

[21] Appl. No.: 713,985

[22] Filed: Sep. 13, 1996

[51] Int. Cl.[6] ............................................. F25J 1/00
[52] U.S. Cl. ................................. 62/605; 60/653
[58] Field of Search ............................... 62/605; 60/563

[56] References Cited

U.S. PATENT DOCUMENTS

| | | | |
|---|---|---|---|
| 3,835,657 | 9/1974 | Scudder | 62/605 |
| 4,072,013 | 2/1978 | Barareschi | 60/563 |
| 4,993,226 | 2/1991 | De Kok | 60/563 |
| 5,419,138 | 5/1995 | Anderson et al. | 62/605 |
| 5,475,981 | 12/1995 | Becker | 62/605 |

*Primary Examiner*—Ronald C. Capossela
*Attorney, Agent, or Firm*—Fay Sharpe Beall Fagan Minnich & McKee

[57] ABSTRACT

A pneumatic apparatus produces high density dry ice pellets without external electric or hydraulic energy. The apparatus operates solely on compressed air for reduced capital and maintenance costs and for portability to harsh or remote locations. An air-over-oil booster is connected to a pelletizing cylinder which is in turn connected to a source of liquid $CO_2$ through an electronic controller. The controller sequences a set of fluid valves for operation of both the booster and pelletizing cylinder.

15 Claims, 4 Drawing Sheets

METHOD AND APPARATUS FOR PRODUCING HIGH DENSITY DRY ICE

BACKGROUND OF THE INVENTION

This application pertains to the art of dry ice production and more particularly to a method and apparatus for producing dry ice using fluid power techniques. Further, the application pertains to a pneumatic $CO_2$ extrusion system and method for rapidly producing dry ice pellets of the type useful in such applications as high pressure particle-blast cleaning and in cold food storage containers to maintain food products at a reduced temperature for preventing spoilage during shipment.

Traditionally, dry ice production involved the use of large, complicated and expensive machinery. In order to produce dry ice pellets of sufficient density, bulky high pressure hydraulic systems were required to compress solidified $CO_2$ within a pelletizing cylinder into dry ice. Cylinders of this type typically include an output end provided with a die having one or more orifices for generating predetermined extrusion shapes and sizes.

Not only were the prior art dry ice machines large and expensive, but they were also difficult to maintain due to the complicated electro-hydraulic systems required to exert the necessary compression forces on the pelletizing cylinder for generating dry ice of a sufficient density. Further, the hydraulic systems used were prone to leakage and, therefore, often required nearly constant maintenance attention.

Lastly, where a source of electric power for driving the hydraulic pump motors is unavailable, the above-described prior art dry ice machines prove useless. In certain specialized applications such as in primitive, remote, or hostile locations, portable auxiliary generators may be needed to furnish the required electrical energy to drive the hydraulic pump motor.

It is, therefore, desirable that a method and apparatus be provided for generating dry ice pellets in a manner which does not require complicated electro-hydraulic actuators to drive the pelletizing piston.

It is desirable that the apparatus be adapted to produce high density dry ice pellets in response solely to a source of a pressurized fluid such as air.

It is further desired that a minimal quantity of hydraulic fluid is required to produce high density dry ice pellets in a low maintenance apparatus which is physically small and quiet when operating.

SUMMARY OF THE INVENTION

The present invention contemplates a new and improved method and apparatus for producing high density dry ice using a compressed fluid source. The improvement overcomes the above-referenced problems and provides a means by which high quality and high density dry ice pellets are produced using only compressed air as a power source.

Although the invention will be described below in connection with compressed air as a power source, those skilled in the art will recognize that any pressurized source of fluid may be used equivalently.

According to the preferred embodiment of the invention, a pneumatic $CO_2$ extrusion system includes an actuator having an output member movable in response to pressurized air applied to said actuator. The actuator is connected to a piston disposed within a pelletizing cylinder for compressing solidified $CO_2$ which is in turn extruded through a die formed in one end of the pelletizing cylinder.

According to a more limited aspect of the invention, the pneumatic $CO_2$ extrusion system includes an air-over-oil booster connected to the piston slidable within the pelletizing cylinder. The air-over-oil booster is responsive to pressurized air applied sequentially to a set of ports provided in the booster.

According to another aspect of the invention, the air-over-oil booster includes an air-oil tank adapted to receive a small quantity of hydraulic fluid therein. The booster also includes a hydraulic cylinder adapted to receive compressed hydraulic fluid from the air-oil tank through a first port disposed therein. The hydraulic cylinder further includes an output piston movable within the hydraulic cylinder and connected to a working piston disposed in the pelletizing cylinder. Lastly, the air-over-oil booster includes an intensifier section wherein a pneumatically actuated plunger is disposed for multiplying the pressure within the hydraulic cylinder and thus increasing the pressure within the pelletizing cylinder.

According to yet another aspect of the invention, the method of operating the pneumatic $CO_2$ pelletizer system includes injecting a first quantity of $CO_2$ into a pelletizing cylinder. The cylinder includes a piston which is low-pressure actuated by applying air to the booster to compress the first quantity of injected $CO_2$. Next, the piston is high-pressure actuated by the booster to further compress the first quantity of injected $CO_2$ to generate a high density dry ice extrusion.

A primary advantage of the invention resides in the ability of the pelletizer system to generate high-density dry ice efficiently and quietly powered solely by a relatively low-pressure source of a fluid such as compressed air.

Another advantage of the invention is in the realization of a reduction in the quantity of components required to produce highly compressed carbon dioxide pellets. This has a direct cost saving effect on maintenance and upkeep overhead.

A further advantage of the invention is a reduced operating cost per pound of dry ice produced. Since the preferred embodiment of the present invention requires no electric motors, no hydraulic pump and an insubstantial oil reservoir holding only about 2.5 gallons, systems mechanical losses and capital investment costs are significantly eliminated. Also, the overall weight of the dry ice is production system is reduced. Nearly a 4 to 1 weight ratio advantage is realized by eliminating the items identified above.

Still other advantages and benefits of the invention will become apparent to those skilled in the art on a reading and understanding of the following detailed description.

BRIEF DESCRIPTION OF THE DRAWINGS

The invention may take physical forming certain parts and arrangements of parts, a preferred embodiment of which will be described in detail in this specification and illustrated in the accompanying drawings, which form a part hereof and wherein.

DETAILED DESCRIPTION OF THE PREFERRED EMBODIMENT

Figure 1:
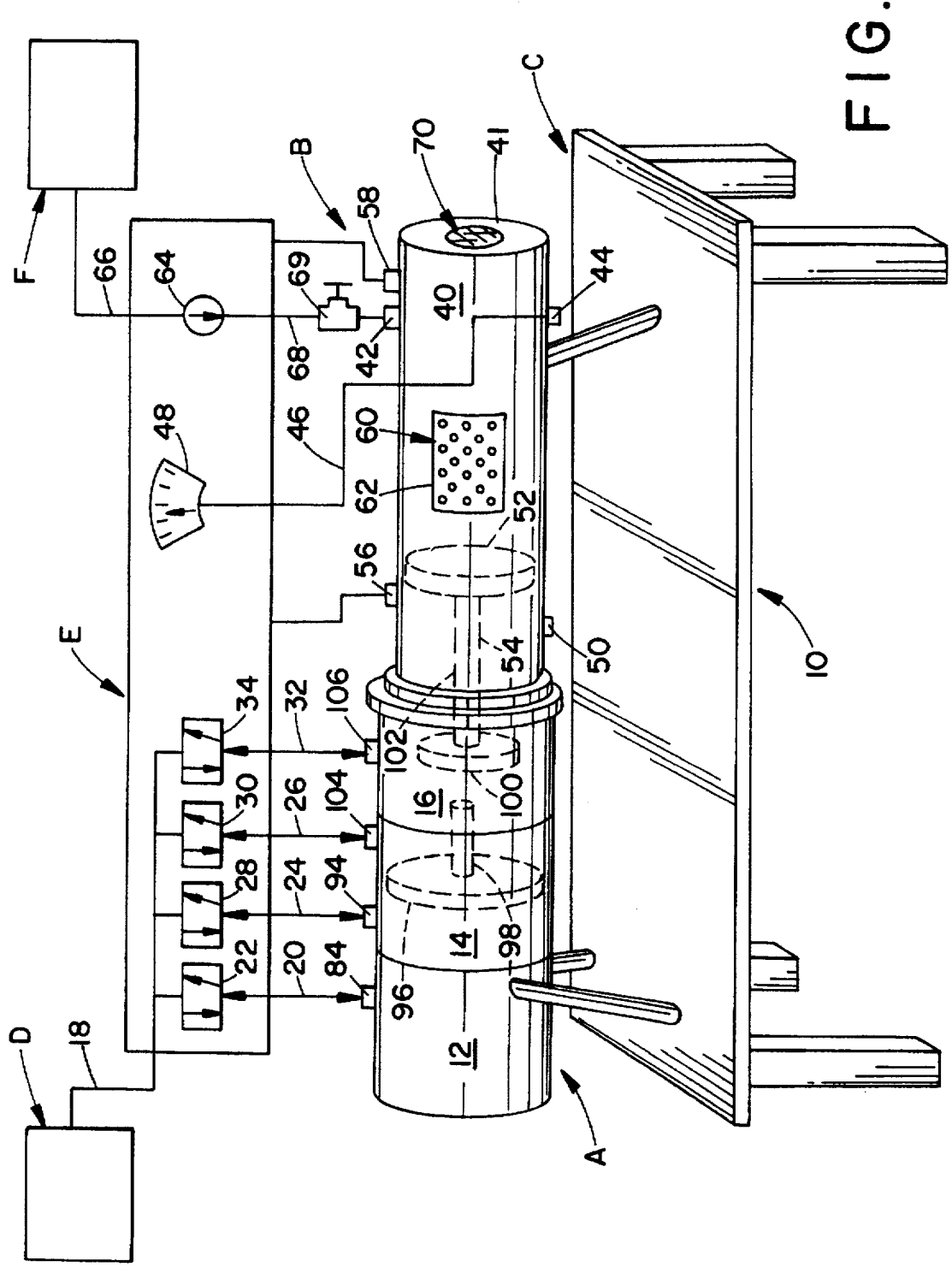
FIG. 1 is a schematic view of the subject invention showing a pneumatic booster connected to a carbon dioxide pelletizing cylinder.

Referring now to the drawing wherein showings are for purposes of illustrating the preferred embodiment of the invention only and not for purposes of limiting same, the FIGURES show a carbon dioxide pelletizer system 10 including a pneumatically operated actuator or booster A directly connected to a $CO_2$ pelletizing cylinder B. Although the system is illustrated in a horizontal inclination, a vertical orientation is possible and may be desirable to conserve floor space.

Both the pneumatic booster A and $CO_2$ pelletizing cylinder B are suitably disposed on a support base C, which may be provided with wheels (not shown) for mobility or with leveling screws (not shown) for temporary or permanent installation. The pneumatic booster A is connected to a source of pressurized air D through a microprocessor-driven electronic control unit E. The $CO_2$ pelletizing cylinder B is in turn connected to a source of liquid carbon dioxide F through the control unit E. The electronic control unit E orchestrates the extrusion operation in a manner hereinafter described for generating the dry ice pellets. The control unit E is illustrated in an exaggerated size for the sake of clarity for discussion only and is in reality much smaller than the booster A and cylinder B.

With reference first to FIG. 1 in particular, the a pneumatic booster A comprises the "hot end" of carbon dioxide pelletizer system 10 and has an output member or shaft 102 (connected to a piston 100) that reciprocates linearly in accordance with pneumatic signals delivered by operation of control unit E. Output member 102 in turn is coupled to or integral with connecting member 54, which in turn is directly connected to piston 52 of $CO_2$ pelletizing cylinder B. Cylinder B which comprises the "cold end" of pelletizer system 10. As will be detailed below, connecting member 54 of booster A actuates piston 52 of pelletizing cylinder B to solidify liquid $CO_2$ within cylinder B and generate dry ice pellets using only compressed air from the source D under the direction and control of the electronic control unit E.

The preferred pneumatic booster A illustrated is of the type available from Rockford Air Devices, inc., Model 12A. The booster generally defines three separate and distinct operational portions including an air-oil tank 12, an intensifier section 14, and a hydraulic cylinder portion 16. As will be described in greater detail below, in the first stage of operation of pelletizer system 10, air-oil tank 12 provides a supply of hydraulic fluid to hydraulic cylinder portion 16 on the left side of piston 100 as shown in FIG. 1, causing interconnected piston 100, output member 102, connecting member 54, and piston 52 to be displaced to the right to compress $CO_2$ within pelletizing cylinder B at a relatively low pressure. In the second stage of operation of pelletizer system 10, a piston 96 within intensifier section 14 is pneumatically actuated so that plunger 98 is displaced within hydraulic cylinder portion 16 to further displace piston 100 and, consequently, increase the displacement of and pressure exerted by piston 52 within pelletizing cylinder B.

Each of the various sections of the pneumatic booster A are connected to the source of pressurized air D through the electronic control unit E via one or more individual fluid conduits and valves. Electronic control unit E is in fluid communication with pressurized-air source D through a main distribution conduit 18. The air-oil tank 12 is connected to the main distribution conduit 18 through a first conduit 20 and fluid valve 22. The intensifier section 14 is connected to the main distribution conduit 18 through a pair of fluid conduits 24 and 26 which are in turn individually respectively connected to the conduit 18 through a pair of fluid valves 28 and 30. Lastly, the hydraulic cylinder portion 16 receives pressurized air from the source D through a conduit 32 and fluid valve 34. Preferably, each of the fluid conduits and valves connected to the pneumatic booster A are bidirectional i.e. permit bidirectional fluid flow, as well as individually energizable via the electronic control unit E. The pressurized air source D preferably supplies air at a pressure of about 80 psi.

In the preferred embodiment of the invention, the dimensions of a standard Model 12A booster from Rockford Air Devices, inc. were modified to provide an output stroke for member 102 of up to 12 inches. Specifically, the lengths of air-oil tank 12, intensifier section 14, and hydraulic cylinder portion 16 were extended to about 18 inches, 23¼ inches, and 19½ inches respectively. Those skilled in the art will recognize that other dimensional modifications, control methods, and pneumatic connections and arrangements are possible for realizing equivalent operation of the invention to be described in detail below.

Figure 2:
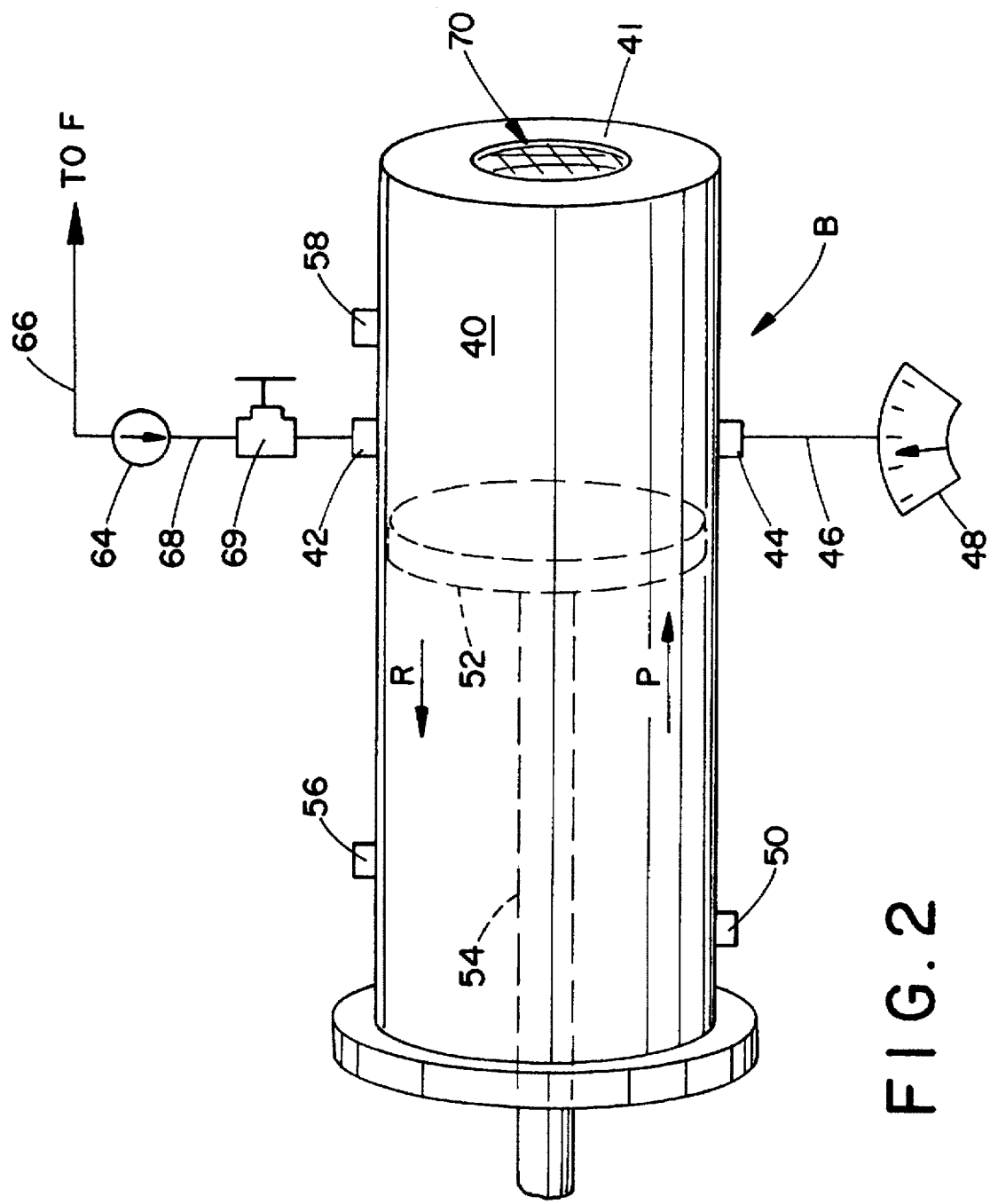
FIG. 2 is a plan view of the $CO_2$ pelletizing cylinder portion of the invention illustrated in FIG. 1; and, FIGS. 3A–3D are cross-sectional views of the pneumatic booster shown in FIG. 1 but disposed in various operating orientations.

Turning first to the cold end or $CO_2$ pelletizing portion of the subject invention shown best in FIG. 2, pelletizing cylinder B generally comprises an elongated steel tube 40 having an end wall 41 and enclosing a piston 52 and connecting member 54. Tube 40 is provided with an injection port 42 for introducing liquid carbon dioxide from source F into cylinder B in the space between piston 54 and end wall 41. A second port 44 is disposed in tube 40 on the opposite side from the injection port 42. The second port 44 is used to obtain pressure readings for use by the control E and also can be used for purging excess $CO_2$ from the tube 40 as needed. The second port 44 is in fluid communication with the electronic controller E through a suitable conduit 46, which in turn cooperates with a pressure gauge or the like 48 for assessing the pressure within the tube 40 at various times during cylinder sequencing. A third port 50 is disposed in the steel tube 40 as illustrated for the purposes of providing an exhaust path for the escape of trapped air or $CO_2$ or when the piston 52 within the tube 40 is withdrawn in the direction R.

As described above and shown in FIG. 1, piston 52 is connected to the output member 102 of the pneumatic actuator or booster A by connecting member 54. In that way, operation of the pneumatic actuator displaces output member 102 to either the left or the right (as shown in FIG. 1), causing a corresponding longitudinal motion of the piston 52 within the tube 40 in the directions R to retract, P to pressurize.

Cylinder B preferably is provided with two proximity switches 56, 58, both communicating with controller E, for detecting the position of piston 52 at the extremes of its stroke. Proximity switch 56 detects when piston 52 is in its fully retracted position, while proximity switch 58 detects when piston 52 has moved to its fully extended position. These proximity switches preferably comprise magneto-resistors that operate by sensing a change in magnetic field created by the presence of magnetic material in the approaching piston 52.

A set of vent holes 60 (see FIG. 1) are provided within tube 40 approximately midway between the stroke limits of the piston 52. The vent holes are commonly referred to in the art as "main exhaust ports" and are placed in the cylinder wall primarily for permitting gaseous carbon dioxide to escape from the pelletizing cylinder B. Vent holes 60 are typically covered with a fine cloth or metallic mesh member 62 for trapping dry ice particles within the steel tube 40, thus preventing solidified carbon dioxide from escaping. Preferably, the mesh member 62 is a stainless steel screen having an opening size of about 10 microns.

With reference again to FIG. 2, when the piston 52 is fully retracted, the electronic controller E (shown in FIG. 1) opens a control valve 64, which permits liquid carbon dioxide to flow from the source F through a feeder conduit 66 and into the injection port 42 of the cylinder B through an injection conduit 68. Preferably, controller E is programmed so that it will not permit control valve 64 to open unless it has received a signal from proximity switch 56 indicating that piston 52 is in its fully retracted position. A limiting valve 69 is placed in conduit 68 to control the flow rate of the liquid carbon dioxide. The carbon dioxide remains liquid while flowing through valves 64, 69 and conduits 66, 68. As the liquid carbon dioxide flows through the injection port 42, however, it solidifies within the steel tube 40 in the form of snow or frozen $CO_2$ particles. Only the carbon dioxide gas is able to escape through the 10 micron stainless steel mesh member 62. The snow particles remain trapped within the cylinder 40.

When the desired amount of liquid carbon dioxide has been flowed through, injection port 42 and injected into tube 40, control unit E closes the control valve 64, and the piston 52 is actuated in the direction P to compress the solidified carbon dioxide into a first area of the tube 40 adjacent end wall 41. Control unit E preferably opens valve 64 for a predetermined time period that will provide for the desired production of dry ice pellets and then closes the valve. In the presently preferred embodiment of the invention, valve 64 is opened for a period that will result in a maximum pressure within tube 40 of about 40 psi. As a safety precaution, control unit E also is programmed to close valve 64 if the pressure in tube 40 (as measured by gauge 48) reaches a higher predetermined level (preferably about 50 psi).

Upon closure of control valve 64, the fluid valves 22, 28, 30 and 34 are operated by control unit E in a sequence to be described below in order to compress the solidified carbon dioxide to an elevated pressure of about 36 tons per square inch. For each stroke of the piston 52 in the direction P, the solidified carbon dioxide is extruded through a die 70 formed in the cylinder 40 to generate high density dry ice pellets.

Figure 3A:
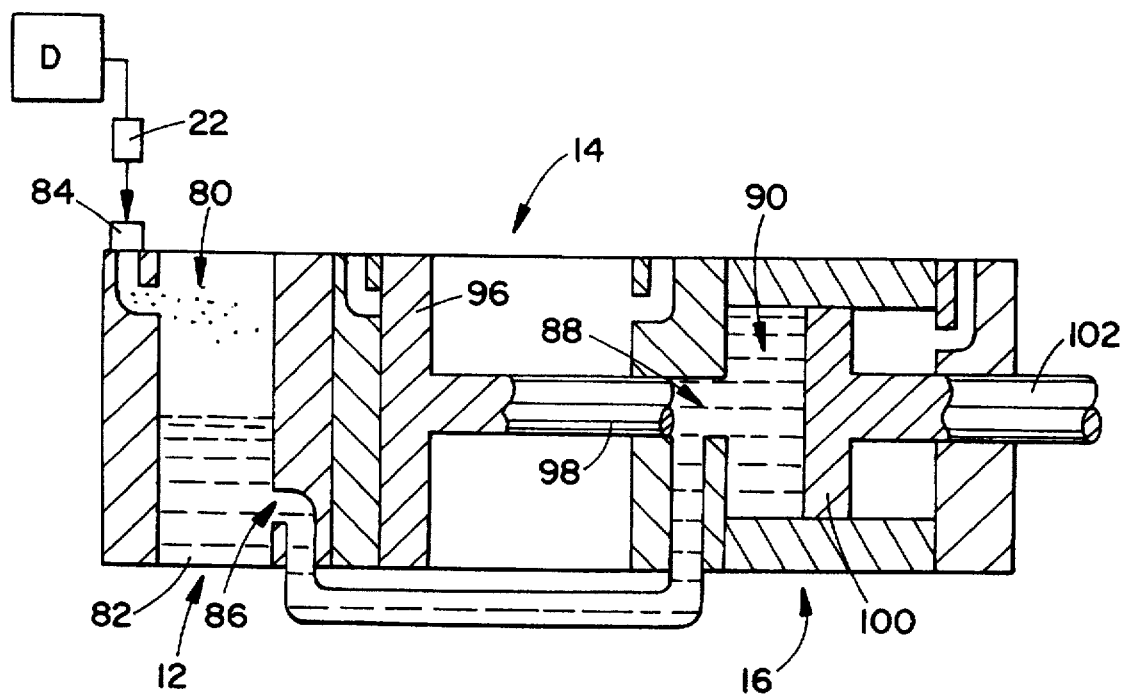

The first step in operating the pneumatic booster A, after introducing the $CO_2$ into the pelletizing cylinder B, is a low pressure advance operation shown in FIG. 3A. A chamber 80 in the air-oil tank 12 is initially partially filled with a small quantity of hydraulic fluid 82. In the preferred embodiment, about two and one half gallons (2.5 gal.) of hydraulic fluid is used. When the fluid valve 22 is opened by the control unit E, the hydraulic fluid is forced by the compressed air from chamber 80 into an oil chamber 90 formed in the hydraulic cylinder portion 16 of the booster A. The hydraulic fluid 82 is communicated through a conduit connecting a port 86 in the tank 12 to a port 88 in the cylinder portion 16. At this stage, the hydraulic fluid displaces piston 100 and output member 102 about 9 inches to the right as shown in FIG. 3A. As a result, piston 52 moves within pelletizing cylinder B by the same distance in direction P (as seen in FIG. 2) with a relatively low pressurizing force.

Figure 3B:
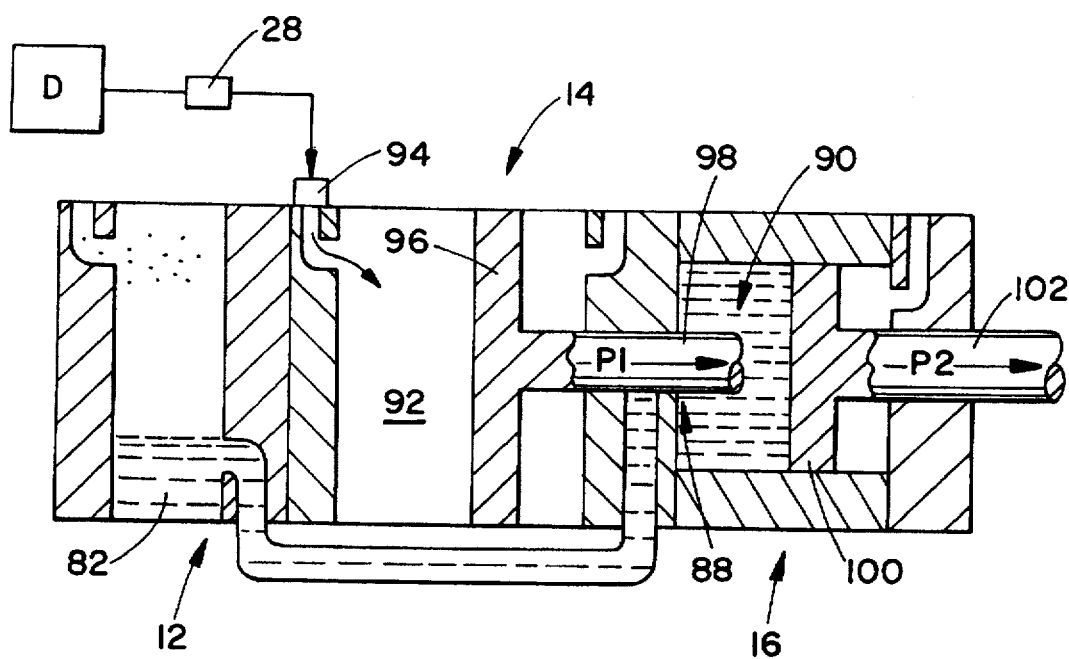

The second step in operating the pneumatic booster A is a high pressure advance operation shown in FIG. 3B. Following the low-pressure stage described above, fluid valve 24 is opened by control unit E to apply a predetermined amount of compressed air from the source D to the intensifier section 14. The compressed air is introduced into a chamber 92 of the intensifier section 14 through a port 94. The compressed air in chamber 92 drives piston 96 within intensifier section 14 in the direction P1 indicated in FIG. 3B. Plunger 98 extends from piston 96 toward adjacent hydraulic cylinder portion 16. As plunger 98 moves to the right along with piston 96, it enters the oil chamber 90 of the cylinder portion 16 through the port 88. Port 88 and plunger 98 are sized correspondingly to effectively seal off chamber 90 from communication with chamber 80 of air-oil tank 12.

As plunger 98 enters chamber 90, it displaces a volume of hydraulic fluid proportional to the extent of travel beyond the port 88. This in turn causes the piston 100 and rod 102 assembly of hydraulic cylinder portion 16 to move in the direction P2 shown in FIG. 3B. The relative sizes of the arrows P1 and P2 represent the relative strokes of the pistons and rods 96, 98 and 100, 102 respectively. Of course, as understood by those skilled in the art, relative distances of these stroke lengths depend upon the diameters of plunger 98 and piston 100. In the preferred embodiment of this invention, the amount of compressed air supplied to chamber 92 is sufficient to result in a stroke of about 1 to 2 inches for output member 102 and piston 52.

This second stage of operation of booster A further compresses the carbon dioxide within pelletizing cylinder B, and high density and good quality dry ice pellets are extruded through the die 70 during the operation shown in FIG. 3B. The pressure within the tube 40 preferably is within the range of 2200–2400 psi during this mode of operation. If the displacement of piston 52 after the initial run of this second stage falls short of proximity switch 58, however, controller E preferably operates valve 28 again to supply additional compressed air to chamber 92 of intensifier section 14, which causes output member 102 to be displaced further to the right as shown in FIG. 3B.

Figure 3C:
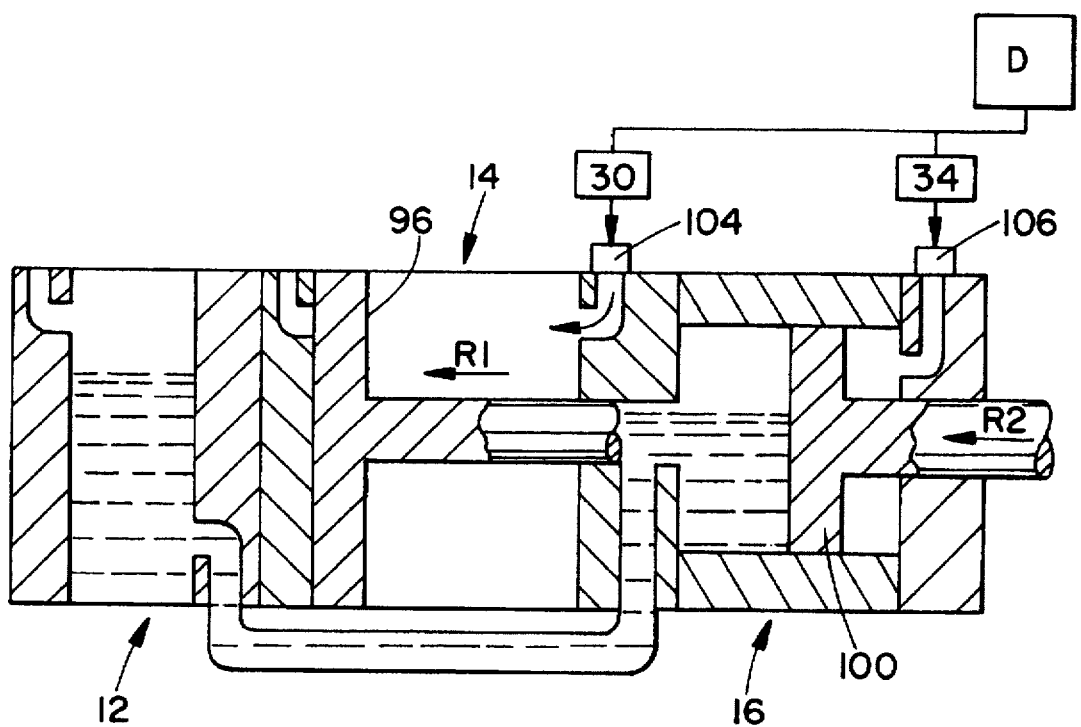
Figure 3D:
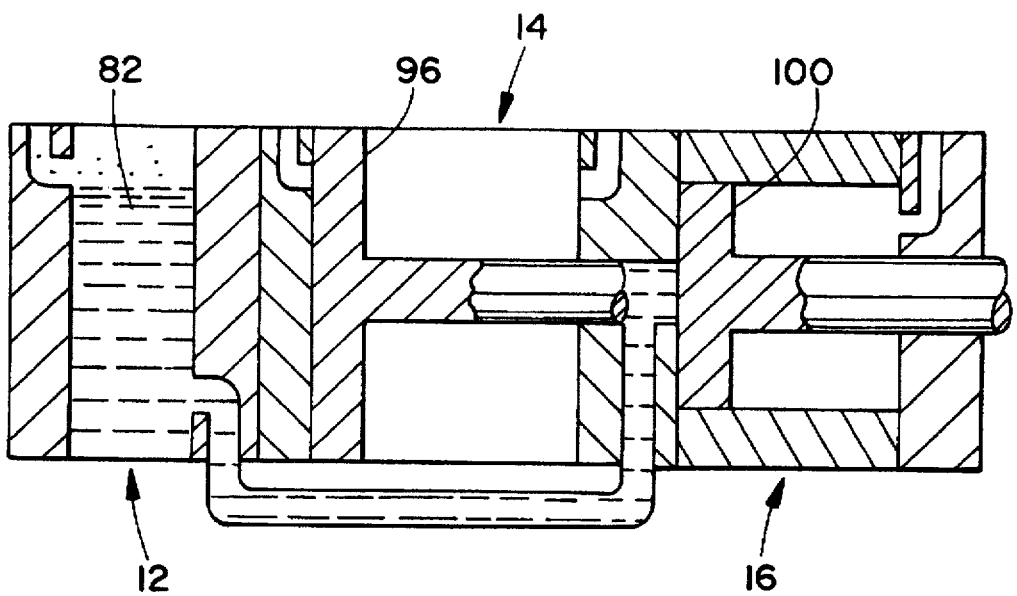

Once proximity switch 58 senses piston 52 at its fully extended position, controller E operates booster A to retract piston 52 as shown in FIGS. 3C and 3D. With reference to FIG. 3C, retraction is accomplished when fluid valves 30 and 34 are operated by the control unit E to apply compressed air from source D to the intensifier 14 and hydraulic cylinder 16 portions, respectively. The valve 30 applies compressed air to the right-hand side of piston 96 through port 104, while valve 34 applies compressed air to the right-hand side of piston 100. This mode of operation returns the piston 96 and rod 98 in the direction R1 to the retracted position shown in FIG. 3D. Similarly, the compressed air through port 106 returns the piston 100 and rod 102 in the direction R2 to the fully retracted position shown in FIG. 3D.

When the rod 102 is in its fully retracted position and piston 52 is sensed by proximity switch 56, additional liquid $CO_2$ is injected into the pelletizing cylinder B for establishing a sequential and continuous dry ice production process illustrated in FIGS. 3A through 3D. As is understood by those skilled in the art, however, efficient operation of pelletizing cylinder B first requires a number of strokes, typically 3 to 4 strokes, to build up a plug of solidified $CO_2$ immediately inboard of die 70, which prevents the easy escape of liquid and gaseous $CO_2$ through die 70.

The invention has been described with reference to the preferred embodiment. Modification and alterations will occur to others upon reading and understanding of this specification. For example, the air-oil tank need not be aligned with the intensifier section and hydraulic cylinder portion of the pneumatic booster. In addition, although the output member of the pneumatic booster preferably is directly connected to the connecting member of the pelletizing cylinder, other connection schemes, including mechanical multipliers and/or gearing, may be used. It is our intention to include all such modifications and alterations insofar as they come within the scope of the appended claims or equivalents thereof.

Having thus described the invention, we now claim:

1. A pneumatic $CO_2$ extrusion apparatus, comprising:
   an actuator having an output member movable in response to pressurized air applied to said actuator;
   a cylinder adapted to receive $CO_2$, said cylinder having an end wall;
   a piston movable in response to motion of said output member of said actuator and disposed within said cylinder, movement of said piston compressing $CO_2$ received in said cylinder toward said end wall of said cylinder; and
   an extrusion die disposed in said end wall of said cylinder for releasing compressed $CO_2$ from said cylinder as solidified $CO_2$.

2. The pneumatic $CO_2$ extrusion system of claim 1, wherein said actuator is a an air-over-oil actuator.

3. The pneumatic $CO_2$ extrusion system of claim 2, wherein:
   said cylinder is adapted to receive liquid $CO_2$ and convert the liquid $CO_2$ into solidified $CO_2$ within said cylinder; and
   said extrusion die is adapted for releasing said compressed $CO_2$ from said cylinder as $CO_2$ pellets.

4. A pneumatic $CO_2$ pelletizer system, comprising:
   a pneumatic actuator having an output member movable in response to compressed air applied to said actuator;
   a pelletizing cylinder adapted to receive $CO_2$, said pelletizing cylinder having an end wall;
   a piston connected to said output member of said actuator and movable within said pelletizing cylinder toward said end wall for compressing $CO_2$ received within said pelletizing cylinder; and
   an extrusion die formed in said end wall of said pelletizing cylinder for releasing the compressed $CO_2$ from said pelletizing cylinder as $CO_2$ pellets.

5. The pneumatic $CO_2$ pelletizer system according to claim 4, wherein said pneumatic actuator is an air-over-oil pneumatic booster.

6. The pneumatic $CO_2$ pelletizer system according to claim 5, wherein said air-over-oil pneumatic booster comprises:
   an air-oil tank adapted to receive a quantity of hydraulic fluid therein, said air-oil tank including i) a first compressed air port for communicating compressed air into said air-oil tank and ii) a hydraulic fluid output port for communicating compressed hydraulic fluid from said air-oil tank;
   a hydraulic cylinder adapted to receive compressed hydraulic fluid from said air-oil tank through an input port, said hydraulic cylinder including a second piston movable within said hydraulic cylinder and connected to said output member of said pneumatic actuator; and
   an intensifier including a pneumatic plunger adapted to enter said hydraulic cylinder through said input port in response to compressed air applied to said intensifier.

7. The pneumatic $CO_2$ pelletizer according to claim 6, wherein said intensifier includes:
   a pneumatic cylinder having a second compressed air port for communicating compressed into said pneumatic cylinder; and
   a third piston connected to said pneumatic plunger and movable within the pneumatic cylinder in response to said compressed air communicated into said pneumatic cylinder.

8. The pneumatic $CO_2$ pelletizer system according to claim 7 wherein said pelletizing cylinder is adapted to receive liquid $CO_2$ and convert the liquid $CO_2$ into solidified $CO_2$.

9. A method of producing high density dry ice comprising:
   a) injecting $CO_2$ into a pelletizing cylinder;
   b) low-pressure actuating a piston reciprocal in the pelletizing cylinder to partially compress the injected $CO_2$;
   c) high-pressure actuating the piston in the pelletizing cylinder to further compress the injected $CO_2$; and
   d) extruding at least a portion of the further compressed $CO_2$ through a die formed in said pelletizing cylinder to generate high density dry ice.

10. The method according to claim 9 wherein:
    the step of low-pressure actuating said piston includes applying a first pressurized fluid to a first port of a booster cylinder connected to the pelletizing cylinder; and
    the step of high pressure actuating said piston includes applying a second pressurized fluid to a second port of said booster cylinder.

11. The method according to claim 10 wherein:
    the step of applying said first pressurized fluid includes applying pressurized air to an air-over-oil portion of said booster cylinder; and
    the step of applying said second pressurized fluid includes applying said pressurized air to a first port of an intensifier portion of said booster cylinder.

12. A method of producing high density dry ice, comprising the steps of:
    a) injecting a first quantity of $CO_2$ into a pelletizing cylinder;
    b) low-pressure actuating a piston reciprocal in the pelletizing cylinder to partially compress the first quantity of injected $CO_2$;
    c) high-pressure actuating the piston in the pelletizing cylinder to further compress the first quantity of injected $CO_2$;
    d) extruding at least a portion of the further compressed first quantity of $CO_2$ through a die formed in said pelletizing cylinder to generate high density dry ice;
    e) retracting the piston within the pelletizing cylinder;
    f) injecting a second quantity of $CO_2$ into the pelletizing cylinder;
    g) low-pressure actuating the piston in the pelletizing cylinder to partially compress the second quantity of injected $CO_2$;
    h) high-pressure actuating the piston in the pelletizing cylinder to further compress the second quantity of injected $CO_2$; and
    i) extruding at least a portion of the further compressed second quantity of $CO_2$ through said die formed in the pelletizing cylinder to generate high density dry ice.

13. The method according to claim 12 wherein said step of injecting a second quantity of $CO_2$ is preceded by a step of detecting the retraction of the piston within the pelletizing cylinder.

14. The method according to claim 12 wherein:
    the step of low-pressure actuating said piston includes applying a first pressurized fluid to a first port of a booster cylinder connected to the pelletizing cylinder; and
    the step of high-pressure actuating said piston includes applying a second pressurized fluid to a second port of said booster cylinder.

15. The method according to claim 14 wherein:

the step of applying said first pressurized fluid includes applying pressurized air to an air-over-oil portion of said booster cylinder; and the step of applying said second pressurized fluid includes applying said pressurized air to a first port of an intensifier portion of said booster cylinder.

* * * * *